United States Patent [19]

Bernard et al.

[11] Patent Number: 5,723,529
[45] Date of Patent: Mar. 3, 1998

[54] SILICA BASED AGGREGATES, ELASTOMERS REINFORCED THEREWITH AND TIRE TREAD THEREOF

[75] Inventors: Yvon André Bernard, Oberpallen; Uwe Ernst Frank, Ettelbruck; Wolfgang Lauer, Mersch, all of Luxembourg; Thierry Florent Edmé Materne, Attert, Belgium; Friedrich Visel, Bofferdange; René Jean Zimmer, Howald, both of Luxembourg

[73] Assignee: The Goodyear Tire & Rubber Company, Akron, Ohio

[21] Appl. No.: 716,120

[22] Filed: Sep. 19, 1996

Related U.S. Application Data

[63] Continuation of Ser. No. 360,543, Dec. 21, 1994, abandoned.

[51] Int. Cl.$^6$ ................................................. C08K 3/00
[52] U.S. Cl. ................................................. 524/492; 524/493
[58] Field of Search ................................. 524/492, 493

[56] References Cited

U.S. PATENT DOCUMENTS

| 4,076,550 | 2/1978 | Thurn et al. | 106/298 Q |
| 4,704,414 | 11/1987 | Kerner et al. | 523/213 |
| 5,116,886 | 5/1992 | Wolff et al. | 523/209 |
| 5,227,425 | 7/1993 | Rauline | 524/493 |

Primary Examiner—Edward J. Cain
Attorney, Agent, or Firm—Henry C. Young, Jr.

[57] ABSTRACT

The invention relates to aggregates comprised of particles which contain silicon dioxide and to elastomers reinforced therewith. The invention also relates to tires having treads composed of such reinforced elastomers.

18 Claims, No Drawings

SILICA BASED AGGREGATES, ELASTOMERS REINFORCED THEREWITH AND TIRE TREAD THEREOF

This is a Continuation of application Ser. No. 08/360,543, filed on Dec. 21, 1994, now abandoned.

FIELD

This invention relates to aggregates of particles of which a portion of the particles is of silicon dioxide and to elastomers reinforced therewith.

In one aspect, the invention relates to tires having rubber treads which are composed of such reinforced elastomers.

Silica, which is primarily composed of silicon dioxide, is often used to reinforce various elastomers, particularly when used in conjunction with a silica coupling agent, or silica coupler.

The silica, or silicon dioxide which is its major constituent, is typically used in the form of an aggregate of the fine silica particles which are bonded together due primarily to the manner in which they are prepared, particularly when the silica is prepared by a precipitation process. In such aggregate form, the primary silica particles are typically sufficiently bonded together so that even upon application of a relatively high shear mixing of silica/rubber mixtures, at least a portion of the aggregate structure remains and the aggregate is not completely broken down to its ultimate primary silica particles. This phenomenon is considered herein to be known to those skilled in the silica/rubber mixing art.

Therefore, silica typically used for rubber reinforcement purposes, while referred to as "silica", it might be more appropriately referred to as aggregates of silica particles.

In one aspect, the invention also relates to tires having rubber treads which are composed of elastomers which are reinforced with aggregates of silica particles of which at least a portion of the particles are of silicon dioxide.

BACKGROUND

Various rubber products, including tires and industrial products, are composed of elastomers, or blends of elastomers, which are conventionally reinforced with reinforcing particulate fillers to enhance their physical properties.

While carbon black is often used for such purpose, silica is also sometimes solely used or, alternatively, is used in conjunction with carbon black to reinforce the elastomers and/or to otherwise enhance their physical properties. The use of carbon black and/or silica to reinforce elastomers is well known to those having skill in such art.

Such silica is normally composed primarily of silicon dioxide which contains silanol groups on its surface as well as water of adsorption unless it is used in a dried or dehydrated form. While the silica can be, for example, of the pyrogenic or precipitated type, the precipitated silica is used in most applications.

As hereinbefore pointed out, for rubber reinforcement purposes, the silica, particularly precipitated silica, is generally considered to be in the form of aggregates of silica particles.

Thus, the term "silica", as may be referred to herein, is generally intended to mean aggregates of silica particles unless the primary silica particles are referenced.

In one aspect, in order to enhance the elastomer reinforcing effect of silica, a coupling agent, or silica coupler, is often used in conjunction with the silica. Such silica coupler is often composed of a moiety which is reactive towards the silanol groups present on the silicon dioxide surface and/or towards Si—O—Si groups, or any other active sites, such as, for example, an organosilane, and of a moiety which is reactive with the carbon-to-carbon double bonds of the elastomer such as, for example, a polysulfide or a mercaptan. The silica coupler, with one moiety reacted with the silica and one moiety reacted with the elastomer, then couples, or connects, the silica to the rubber in a manner which enables the silica to more effectively reinforce the rubber. Such use of silica couplers is considered to be well known to those having a skill in the silica reinforcement of rubber art.

Numerous coupling agents are taught for use in combining silica and rubber, such as for example, silane coupling agents which contain a polysulfide component, or structure, such as bis-(3-triethoxysilylpropyl) tetrasulfide. Such coupling agent has a silane moiety which is reactive with silicon dioxide of the silica and a tetrasulfide moiety which is reactive with carbon-to-carbon double bonds of a sulfur curable elastomer. Dithiodipropionic acid, for example, may also be considered for use as a silica coupling agent either individually or, for example, in combination with the aforesaid silane tetrasulfide coupling agent.

Pneumatic rubber tires are conventionally prepared with a rubber tread which can be a blend of various rubbers, or elastomers, which may be reinforced with carbon black, silica or mixtures or carbon black and silica.

Various U.S. patents relating to silicas and silica reinforced tire treads include U.S. Pat. Nos. 3,451,458; 3,664,403; 3,768,537; 3,884,285; 3,938,574; 4,482,663; 4,519,430; 4,590,052; 5,066,721; 5,089,554; EPO501227-A and British 1,424,503.

For tire treads, rubbers are conventionally evaluated, selected and blended for a purpose of achieving desired tire tread properties and particularly a balance of tire tread characteristic properties, mainly, rolling resistance, traction and wear.

The elastomer reinforcing ability of aggregates of silicon dioxide is often considered to be due to the size and shape of the aggregates, their surface activity and porosity as well as various chemical and physical interactions of the silica aggregates with silica couplers and/or elastomers.

The elastomer reinforcing ability of silica aggregates tend to be different among the various types of silica aggregates which can result in substantial variations in silica reinforced elastomer processing, prior to sulfur vulcanization of the elastomer, as well as properties of vulcanized silica reinforced elastomers. Such phenomena are well known to those having skill in the silica reinforced rubber art.

It is considered herein that an important disadvantage of many silica aggregates used for tire tread elastomer reinforcement is, for example, evidenced by a difficulty providing a silica reinforced elastomer for a tire tread which will demonstrate a suitable balance between tread wear, rolling resistance and traction properties for the tire.

It is further considered herein that silica aggregates used in elastomer reinforcement are sometimes observed to be difficult to disperse sufficiently homogeneously or sufficiently efficiently within the elastomer to provide a silica reinforced elastomer for a tire tread having a suitable balance between treadwear, rolling resistance and traction for a tire.

While the mechanism or theory relating to the relationship between dispersibility of various silica aggregates in various elastomers and resultant elastomer properties may not be fully understood, it is considered herein that characteristics of various silica aggregates themselves are involved or relate to such relationship.

Silicas are typically produced by one of three processes and are generally referred to by the general process in which they are produced, namely pyrogenic, gel and precipitated silicas. For elastomer reinforcement, precipitated silicas are usually preferred.

Pyrogenic or fumed silicas may be produced, for example, by a vapor process in which silicon tetrachloride vapor is reacted with oxygen and hydrogen at elevated temperatures.

Silica gels, which may be, for example, hydrogels, xerogels or aerogels, may be produced by reacting a soluble silicate such as sodium silicate with a strong sulfuric acid. The resulting gel is washed to remove residual salt, dried and then usually micronized by steam treatment to form a hydrogel. Aerogels may be similarly produced except that the water of the gel is replaced by an alcohol following which the gel is heated to remove the alcohol under super critical drying conditions (high pressure and high temperature into an autoclave). Contrary to aerogels, xerogels are not dried under super critical conditions. They are indeed inorganic hydrated oxide precipitated from an aqueous solution and dried in air or under a vacuum.

Precipitated silicas may be produced, for example, by forming a soluble silicate by reacting particles of silicon dioxide (eg: sand) with a strong base, such as sodium hydroxide, to form after dissolution an aqueous silicate solution; followed by destabilizing the silicate solution by addition of an organic or mineral acid and/or acidifying gas such as carbon dioxide to change the pH of the mixture and cause a reaction to take place from which the silica is precipitated, substantially in the form of fine particles of silicon dioxide which may be in the aforesaid aggregate form and may appear in a gel-like form. The resulting slurry, or gel, is conventionally filtered and washed with water to remove the reaction by-product, which is the alkali metal salt of the acidification agent. The filter cake is then typically dried to yield a silica of desired aggregate particle size. There are many variations of the precipitation process involving, for example, sequential and/or intermittent additions of the silicate solution and/or acid, control of the pH, optionally stopping the acid addition and ageing of the mixture prior to resuming acid addition to reach the desired pH, ageing the gel or filter cake prior to washing with water which might sometimes be called post ageing and variations of various process temperatures and times.

A process of producing a silica may be found, for example, in European Patent publication EP-A1-170579.

The physical characterizations of the precipitated silicas, namely the aggregates thereof, can vary considerably as well as their use as reinforcement for elastomer(s) and resulting elastomer properties according to the selection of silicate reaction materials and reaction conditions.

In one aspect, it is desired to provide an aggregate of particles for the reinforcement of elastomers which are somewhat similar to aggregates of silica particles except that a portion of the silicon present in the silicon dioxide particles has been replaced with other atoms and, further, that functional groups and/or polymers have been grafted to the silica surface and/or that the aggregate has been treated with a surfactant.

SUMMARY AND PRACTICE OF THE INVENTION

In accordance with this invention, a process of producing an aggregate of particles comprises the steps of:

(A) reacting at least two inorganic materials with a strong base and forming a water solution of a product thereof, wherein said inorganic materials are comprised of, based on 100 parts by weight thereof, about 0.1 to about 99.9, preferably about 60 to about 99.9, parts silicon dioxide and, correspondingly, about 99.1 to about 0.1, preferably about 40 to about 0.1, parts of at least one additional inorganic material selected from an oxide and/or salt of at least one of aluminum, iron, magnesium, boron, phosphorus, titanium, zirconium, vanadium and niobium; with a restriction that said additional inorganic material is reactive with a strong base to form a water soluble product thereof;

(B) treating said water solution by the addition of at least one mineral acid thereto to react with said product to form a reaction product thereof and to reduce the pH of the solution and thereby produce precipitated particles of the reaction product as a precipitate of aggregates;

(C) optionally, interrupting the said acid addition of step (B) to the said water solution to allow the said precipitate to age for a period of time, such as, for example, at a temperature of about 15° to about 50° C. for a period of time of about 7 to about 120 minutes, followed by a resumption of acid addition until a desired pH is reached to complete the said reaction to a desired degree and to complete a precipitation of the reaction product;

(D) optionally, after said acid addition of step (B), and/or step (C) if used, is completed, allowing the precipitate to age for a period of time, for example, at a temperature of about 15° to about 50° C. for a period of about 7 to about 180 minutes;

(E) filtering and washing the said precipitate with water, for example, tap-water or preferably deionized water, and drying the precipitate to recover the primary particles in the form of an aggregate thereof and having adsorbed water on the surface of the particles;

(F) optionally modifying step B and/or step C by treating the said precipitate by the addition to said precipitate of at least one electrolyte having an anion selected from carbonate, silicate, aluminate, borate, alumo-silicate, phosphate, sulfate, halogenide, titanate and zirconate and cation selected from at least one of lithium, sodium, potassium, magnesium and/or calcium.

(G) optionally an additional step, during and/or following step (E), comprised of grafting onto said reaction product or precipitate at least one functional group and/or polymer, by a process of a reaction between the silanol groups, Si—O—Si groups and/or any other active sites on the surface thereof wherein said functional group is provided by the reaction therewith at least one of one of (i) material of the type X and/or X-R, (ii) material of the type X-R-Y and (iii) a material of the type X-R-Z and/or (X-R-Z)$_2$ wherein where R is an aliphatic hydrocarbon radical having from 2 to 30 carbon atoms or an aromatic or hydrocarbon substituted aromatic radical having from 6 to 30 carbon atoms, X and Y are the same of different radicals selected from at least one of hydroxy, amino, alcoholate, cyanide, thiocyanide, halogen, organo functionalized sulfur derivities such as for example sulfonic acid and sulfonic acid esters, thiol, benzoic acid, benzoic acid esters, carboxylic acid, carboxylic acid ester and organo silane radicals and Z is a radical selected from $S_n$ and $Se_n$, where n is an integer of from 2 to 6, or an unsaturated radical selected from allyl, vinyl, acryl and aryl radicals; and where said polymer is selected from at least one of synthetic cis 1,4-polyisoprene natural and/or natural rubber, cis 1,4-polybutadiene, polystyrene, polychloroprene, polyacrylonitrile, styrene-butadiene-copolymer rubber, butadiene-isobutylene-copolymer, EPDM, styrene-isoprene-butadiene terpolymer rubber and isoprene-butadiene copolymer rubber;

(H) optionally an additional step, following Step (E) comprised of treating the said dried precipitate with at least one ionic and/or non-ionic surfactant;

provided, however, that the said process shall include at least one of steps (F), (G) and (H).

In the practice of this invention, while various strong bases may be used, sodium hydroxide or sodium carbonate are preferred. While various mineral or organic acids may be used in the practice of this invention, hydrochloric acid and sulfuric acid are preferred.

In the practice of this invention, for step (A), the strong base is reacted with the aforesaid inorganic materials and a water solution is prepared of the product thereof. In one aspect, the strong base can be in a form of an aqueous solution thereof, thereby, in accordance with step (A), reacting the inorganic materials in the presence of water with the strong base to form the water solution of the product thereof.

In the practice of the process of this invention:

(i) An important aspect of a process of producing silica and the resulting primary particles and aggregates thereof is step (A) of the process in which the introduction of additional inorganic materials such as aluminum, iron, magnesium, boron, titanium, zirconium, vanadium, niobium, and/or phosphorous atoms for partially replacing silicon atoms.

Thus, in one aspect of this invention, such additional inorganic material is at least one oxide and/or salt of aluminum, magnesium, iron, boron, titanium, zirconium, zinc, vanadium, niobium and phosphorus and including natural and synthetic aluminum silicates, of which the reaction with a strong base such as, for example, sodium hydroxide, forms a water soluble product thereof. The natural and/or synthetic aluminum silicates, which are generally well known, may be a particularly desirable additional inorganic material.

Representative examples of oxides and salts thereof are aluminum oxide, iron sulfate, magnesium sulfate, boron oxide, titanium dioxide and sodium phosphate and calcium phosphate.

It is considered herein that the overall reactivity of the aggregate as well as the aggregate size i.e. the number of particles building up the aggregates is believed to be largely determined by the amount of so-called replacement of the silicon atom.

The reactivity as well as the aggregate size will be mainly determined by the amount of Al and the process of production. In addition to or as replacement for Al other elements such as Mg, B, Fe, P and S can be introduced to tailor the silica towards optimal performance to the selected elastomer.

The composition of the silica is transformed by this modification from a pure composition of the type $(SiO_2)$ x $(H_2O)$ y up to $Al_2O_3$. Such modification is described in *Chemistry of the Elements*, by N. N. Greenwood and A. Earnshaw, Pergamon Press 1985, pp 397.

(ii) Treatment by an electrolyte is accomplished by addition to the batch in step (B) or (C) which is before or during the precipitation step and is considered beneficial for aggregate size and aggregate size distribution control which it is believed are important for enhanced filler dispersion within an elastomer.

(iii) Grafting functional group(s) and/or selective polymer (s) onto the silica surface is considered herein to improve or enhance the interaction between the aggregate of primary particles and an elastomer, or rubber, for which it is desired that the aggregate act as a reinforcement therefor, from both a chemical and a physical standpoint. Such improvements are considered herein to be provided by one or more of three types of mechanisms.

First, grafting a chemical, or polymer, with a polar group at one end and an apolar organic group at the other end may be considered. The reaction of the polar group of the grafting material with the silica is considered herein to tend to hydrophobize the silica or the silica modified according to steps (i) and (ii) hereinbefore mentioned and improve its compatibility with the bulk elastomeric matrix by improved van der Waals interactions, thereby decreasing polarity of the silica surface and improving its dispersibility in said matrix. Representative of such chemicals and polymers are of the type X-R, in which R is an aliphatic hydrocarbon radical from 2 to about 50, preferably about 2 to about 30, carbon atoms or an aromatic or hydrocarbon substituted aromatic radical having from 6 to about 30 carbon atoms and X is a radical selected from at least one of hydroxy, amino, alcoholate, cyanide, thiocyanide, halogenide, sulfonic acid, sulfonic acid esters, thiols, carboxylic acid and carboxylic acid esters. More specific representative examples thereof are neodecanoic acid, octylcyanide, octylthiocyanide, n-butanol, butylamine and acetylacetone.

Secondly, replacing the silanol groups, Si—O—Si groups or any other active sites on the surface of the silica particles by another polar group is considered herein to change the reactivity and overall polarity of the silica particle surface may be considered. Representative of such chemicals are of type X-Y and X-R-Y where R is an aliphatic hydrocarbon radical, or from 2 to about 50, preferably about 2 to about 30, carbon atoms or an aromatic or hydrocarbon substituted aromatic radical having from 6 to about 30 carbon atoms and X and Y are the same or different and are selected from the aforesaid X radicals. More specific representative examples thereof are adipic acid, hexane diol, pentanediamine, ethanolamine, and (3-nitrile) propionic acid ester.

Thirdly, a reaction of the silanol groups, Si—O—Si or any other active sites on the surface of the silica particles with dedicated coupling molecules, which in turn, are considered herein to create a hydrophobized surface on the silica particles, which is then able to further react with the polymeric phase. Representative of such types of chemicals, or units are X-R-Z or $(X-R-Z)_2$, where R is an aliphatic hydrocarbon radical, or chain, having from about 2 to about 50, preferably about 2 to about 30, carbon atoms or an aromatic radical or hydrocarbon substituted aromatic radical having from 5 to 50, preferably about 6 to about 30 carbon atoms, X is a radical as a hereinbefore described X radical, and Z is a radical selected from at least one of $S_n$ (a polysulfide), $Se_n$ (a polyselenide), where n is an integer of 2 to 6 or unsaturated radical selected from at least one of allyl, vinyl, acryl, and aryl radicals. More specific representative examples thereof, for instance, are $((CH_3—CH_2—O)3—Si—(CH_2)_3—S—S)_2$, $((CH_3—CH_2—O)—Si—(CH_2)_3—Se—Se)_2—((CH_3—CH_2—O)_3 —Si—(CH_2)_3—S)_2$ and 1-acetyl-3 -allyl propane.

(iv) treating the surface of the precipitate, or aggregate, with a non-ionic and/or ionic surfactant is considered herein to be beneficial to aid in the processability and dispersibility of the aggregate in a hydrophobic polymeric matrix such as, for example rubber and elastomers such as, for example, those previously set forth. The treatment may be accomplished, for example, by treating the dried precipitate, or aggregate, by making a reversible adsorption of the polar end(s) of an organic molecule, namely a surfactant. This might be done, for example, by mixing the dried aggregate together with the surfactant in a suitable reactor. Representative of such type of processing aid are of general type M-R-N of which R is an aliphatic hydrocarbon radical, or chain, having from about 5 to about 100, preferably about 10 to about 30, carbon atoms, or an aromatic radical or hydrocarbon substituted aromatic radical having from 5 to about 50, preferably from about 6 to about 30 carbon atoms. M and N are the same or different moieties belonging to the families of for example, amine, polyalcohols, polyamines, polyether, etc. which characteristically do not react or react only slowly with silanols. By "not reacting with the silanols" it is meant herein that where there may be a capability of reaction with silanols, the reaction is considered herein to be of a reversible type of interaction between silanols and the surfactant. Formation of a hydrogen bridge would be a representative example. In that sense, it is considered herein that there is no substantially irreversible chemical link between the $SiO_2$ and the surfactant. Representative examples thereof are polyethyleneglycol, polyethyleneglycol ether, polyamines, and aminoalcohols which are commercially available surfactants known to those skilled in the art.

The surfactant may be of a commercially available type, including for example, alkylbenzene sulfonate, alcohol sulfate, alcohol ether sulfate, alcohol ethoxylate, alkylphenol ethoxylates, fatty acid alkanolamines, or fatty acid amine oxides.

In the practice of this invention, for step (A) of the process, the aluminum, iron, magnesium, boron, titanium, zirconium, vanadium, niobium and phosphorus can be introduced as, for example, as oxide or salt thereof, so long as the requirement that the reaction thereof, in the presence of water, with a strong base produces a aqueous solution of a product thereof. Representative examples are salts selected from at least one of carbonate, silicate, aluminate, borate, alumino-silicate, phosphate, sulfate, halogenide either pure or in the hydrogenated form, e.g. $NaHSO_4$, $KH_2PO_4$, $Na_2H_2SiO_4$, etc. Combinations of the salts or mixed salts, eg. $(NaH_2PO_4)_x * (CaF_2)_y$ may also be used. The cation of the salt is considered herein to be also of some importance and may be of any suitable element and is more preferably selected from the alkali or earth alkaline group of the periodic system such as, for example, Na, K, Ca, Mg, Li; others could be Zr, Fe, etc. to preferably produce a water soluble salt thereof upon addition of sodium hydroxide. Thus, representative examples of such salts are iron sulfate, magnesium sulfate, calcium chloride, potassium phosphate, zirconium sulfate, titanium dioxide and zinc oxide.

For the grafting step (G), the grafting of functional groups onto one or more particles of the aggregate may be accomplished through chemical bonding between any coupling agent described in the literature for $SiO_2$ and reinforcing filler which will provide the functional groups. Representative of such types of chemicals are of types X-R-Z or $(X-R-Z)_2$. $(X-R-Z)_2$ is a symmetrical molecule e.g. X-R-Z-Z-R-X bis-(3-triethoxysilylpropyl)tetrasulfide: $(CH_3—CH_2—O—CH_2—O)_3—Si—(CH_2)_3—S—S—S—S—(CH_2)_3—Si—(O—CH_2—CH_3)_3$ including organosilanes such as, for example, $((CH_3—CH_2—O)_3—Si—(CH_2)_3—S—S)_2$, wherein X is a radical selected from at least one of alcohol, amino, cyanide, thiocyanide, halogen, hydroxyl, sulfonic acid esters, sulfonic acid sulfonates, carboxylic acid, carboxylic acid esters and organosilane radicals; wherein R is an aliphatic hydrocarbon radical having from 1 to 50 carbon atoms or an aromatic hydrocarbon radical having from 6 to 60 carbon atoms; and wherein Z represents $S_n$ (a polysulfide), $Se_n$ (a polyselenide); wherein n is an integer of from 1 to 6; and wherein said $(X-R-Z)_2$ may also be selected from at least one of the symmetrical molecules of X-R-Z-Z-R-X bis-(3triethoxysilylpropyl)tetrasulfide, $(CH_3—CH_2—O—CH_2—O)_3—Si—(CH_2)_3—S—S—S—(CH_2)_3—Si—(O—CH_2—CH_3)_3$ and $((CH_3—CH_2—O)_3—Si—(CH_2)_3—S—S)_2$. Z may also be an unsaturated radical as described in standard textbooks, representative materials of which are, for example, allyl radicals having from 4 to 10 carbon atoms, vinyl radicals having from 4 to 10 carbon atoms, acryl radicals having from 8 to 30 carbon atoms, aryl radicals having from 8 to 30 carbon atoms, pyridyl radicals having from 8 to 30 carbon atoms and piperidine radicals in which x is an integer of from 1 to 8, preferably from 3 to 6. Various of the chemicals abovementioned can be prepared following the methods described, for example, in Angewandte Chemie, Vol.25, N.23, 1986, pp.236 by U. Deschler, P. Kleinschmidt, P. Panster or EP-A-90123475.5. Representative examples thereof are $((CH_3—CH_2—O)_3—Si—(CH_2)_3—S—S)_2$; $((CH_3—CH_2—O)_3—Si—(CH_2)_3—Se—Se—)_2$; $((CH_3—CH_2—O)_3—Si—(CH_2)_3—S)_2$ and 1-acetyl-3-allyl propane.

It is considered herein that the size and shape of the primary particles which can be round or jagged, and that the size distribution of the primary particles as well as of the aggregates and of the pores are as important as the types and amounts of functional groups attached to the surface of the primary particles.

Such properties of the primary particles and aggregates thereof are considered herein to be suitably obtained by control of the materials utilized, the process of precipitation and the drying process.

In the practice of the invention, the aggregates may be used as reinforcing filler for various solution polymerization prepared as well as emulsion polymerization prepared diene based elastomers such as, for example, cis 1,4-polyisoprene rubber natural and synthetic, cis 1,4-polybutadiene rubber, styrene/butadiene copolymer rubber, butadiene/isobutylene copolymer rubber, EPDM rubber, styrene/isoprene/butadiene terpolymer rubber, butadiene/acrylonitrile rubber, 3,4-polyisoprene rubber and isoprene/butadiene copolymer rubber.

In most cases, it is desired to use the aggregates of this invention as such or in combination with a silica coupler for the purpose of reinforcing a diene based elastomer.

Thus, in one aspect of the invention, a rubber composition, and tire having a rubber tread comprised of such composition, is provided which is comprised of (A) 100 parts by weight of at least one diene based elastomer, (B) about 5 to about 100, optionally about 60 to about 90, parts by weight of an aggregate of this invention and (C) a silica coupler having a moiety reactive with silicon dioxide and a moiety reactive with the said elastomer, which might be generally be thought as being reactive with the carbon-to-carbon double bonds of the elastomer.

The aggregate produced by the described methods is hygroscopic and sensitive to water and humidity. It is normally recommended, especially where the dried surface of the aggregate (particles) is treated by surfactant(s), that the aggregates be packed in sealed, weighed, bags for prevention of contamination by water, humidity and/or other material from the environment. Such protected aggregates are considered herein to provide good dispersion, reactivity and stability for use in the reinforcement of elastomers.

In one aspect of the invention, it is desired that the aggregate have at least one of the following physical parameters to be suitable for use as reinforcement for elastomers:

a) a BET-SSA surface area of from about 100 to about 500, preferably about 150 to about 300, m²/g;

b) a Hg-SSA from 100 to 300.m²/g and preferably at least about 120 m²/g to 200 m²/g;

c) a Hg total introducible volume from 1.3 to 3.0 and preferably from 1.5 to 1.9 cm³/g.

d) a Hg-pore distribution for the primary particles of the aggregate with about 0 to about 5% of its pores having a diameter of less than about 10; about 60 to about 90% of its pores having a diameter of about 10 to about 100 nm; about 10 to about 30% of its pores having a diameter of about 100 to about 1000 rim; and about 5 to about 20% of its pores having a diameter greater than about 1000 nm; and e) a CTAB surface area of from about 100 to about 300, preferably about 120 to about 190.m²/g.

It is considered herein that the aggregates of this invention may also be, in general, typically characterized by having a projected area of the silica aggregates ranging between 1,000 and 20,000×10⁻¹⁸ m² and preferably about 2000 to about 10,000×10⁻¹⁸ m²).

The projected area of an aggregate can be determined, in general, by ASTM test No. D3849. In particular a transmission electron microscope can be used, with a magnification of 150,000× at 120 kilovolts, coupled with an on-line image analyzer. Sample preparation is considered important. In particular, a sample can be prepared by the steps of dispersing 10 mg of aggregate in a 30 ml mixture of 10 ml of water and 20 ml isopropyl alcohol in a glass beaker of 250 ml capacity, for example. The beaker is positioned within the ultrasonic device and operated at a temperature of about 25° C., a frequency of about 55 kHz and an energy level of about 100 W for 1 hour. One drop is then dried on a Formvar (a trademark of the Monsanto Company) coated grid. The Formvar grid is obtained from Balzers as item number BU-006-034-T. The projected area is typically determined as an average of least 2,000, preferably at least 8,000, aggregates and reported in terms of square meters (for example, $10^{-18}$ m².

In case of surface treated aggregates by a chemically bonded material of type X-R, X-R-Y, X-R-Z and (X-R-Z)₂ described hereinbefore, the percentage of the CTAB surface area of the aggregate which has reacted with the substituent should be from about 1 to about 100, and preferably from 2 to 50 percent.

In case of the detergent treated aggregate, of step H herein, the detergent content should be comprised from about 0.1 to about 50, preferably about 2 to about 20 percent of the silica weight. In this manner, it is considered herein that the associated water of absorption on the surface of the aggregate is somewhat replaced by the detergent.

The density of the aggregates of this invention is considered herein to be typically in a range of about 0.1 to about 3.0 g/cm3. It is considered herein that very low density aggregates are beneficial to reduce somewhat significantly the weight of aggregate reinforced elastomers which can be an important consideration in various manufactured products such as for example rubber tires, including the treads of tires.

Several of the above referenced characteristics of the aggregates may suitably be determined as follows:

a) the CTAB surface area is the external surface area as evaluated by cetyl trimethylammonium bromide with a pH of 9. The method is described in ASTM D 3849-80 for set-up and evaluation. The CTAB surface area is a well known characterization of silica.

b) the Hg surface area/porosity is the specific surface area determined by Mercury porosimetry (porosimeter used: CARLO-ERBA, Porosimeter 2000). The mercury is penetrated into the pores of the sample after a proper thermal treatment to remove volatiles. Set-up conditions may be suitably described as using a 100 mg sample; removing volatiles during 2 hours at 105 C and ambient atmospheric pressure; ambient to 2000 bars pressure measuring range. Such evaluation may be performed according to the method described in Winslow, Shapiro in ASTM bulletin, p.39 (1959); and c) the BET surface values may be obtained using the method described in Brunnauer, Emmet, Teller *Journal of the American Chemical Society*, Vol.60, p.309 (1938). Set-up conditions may be suitably described as using a 500 mg of sample; first degassing 2 hours at 105° C., ambient pressure; and a second degassing for 1 hour at 150° C. at $10^{-3}$ mm Hg. The BET surface area is a well known characterization of particles and aggregates of various materials including silicas.

In further accordance with this invention, a pneumatic tire is provided having a tread comprised of (A) 100 parts by weight of at least one diene based elastomer, (B) about 5 to about 100, optionally about 30 to about 90, phr of an aggregate material which is a material comprised of about 50 to about 100, preferably 100, weight percent of the aggregate of this invention and correspondingly, about zero to about 50 weight percent silica, (C) at least one silica coupler having a moiety reactive with silicon dioxide and a moiety reactive with said elastomer, in a weight ratio of aggregate and silica, if silica is used, to coupler of about 7/1 to about 15/1, and (D) about 0 to about 80, optionally up to about 30, and optionally about 5 to about 30, phr carbon black, wherein the weight ratio of aggregate and silica, if silica is used, to carbon black, where carbon black is used, is at least about 0.1/1, optionally at least about 3/1, optionally at least 10/1 and optionally from about 3/1 to about 30/1 and where the total of aggregate and silica, if silica is used, and carbon black, if carbon black is used, is about 60 to about 120, preferably about 70 to about 90 phr. The term "phr" as used herein, and according to conventional practice, refers to "parts of a respective material per 100 parts by weight of rubber".

Various commercially available silicas may also be mixed with the aggregates of this invention for the reinforcement of the diene based elastomers. Such silicas are typically characterized by the aforesaid BET and CTAB surface areas. Representative of such silicas, for example, only and without limitation, are silicas available from PPG Industries under the Hi-Sil trademark with designations 210, 243, etc; silicas available from Rhone-Poulenc, with designations of Z1165MP and Z165GR, silicas available from Degussa AG with designations VN2 and VN3, and silicas available from AKZO Chemie, etc.

In the practice of this invention, it is optionally preferred that the aggregate material of the (B) component of the tire tread is a material which consists essentially of the aggregate of this invention. Thus, in this sense, for this optionally preferred aspect of the invention, while the aggregate may contain a very minor amount of silica (eg. less than about 10 percent by weight), it is primarily and essentially, or practically, about 100 percent of the aggregate of this invention.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention which is more primarily directed to the utilization of the aggregates of this invention for the reinforcement of elastomers and to tires with treads composed of such reinforced elastomers.

The tires can be built, shaped, molded and cured by various methods which will be readily apparent to those having skill in such art.

Additional Disclosure and Practice of the Invention

As hereinbefore pointed out, it is desired that the aggregates of this invention are characterized by BET and CTAB surface area values and by mercury (Hg) porosity measurements.

While it has also hereinbefore indicated that the aggregates may also be characterized by a projected area range of values, it is considered herein that measurement of aggregate projected area by transmission electron microscope analysis of prepared specimens can be subject to numerous judgmental factors including sample preparation methods and particle analysis technique.

Accordingly, as will be hereinafter discussed, it remains desired that the aggregates of this invention be characterized by BET and CTAB surface area and mercury porosimetry values without utilizing particulate projected area as a characterization value.

Consequently, in one aspect of the practice of this invention, specific precipitated aggregates with specialized characterizations are desired.

The precipitated aggregates are typically in a form of aggregates of a multiplicity of primary particles which are somewhat fuzed, or otherwise bound, together. The aggregates tend to agglomerate themselves, mainly through the formation of hydrogen bridges, tend to form larger entities or agglomerates.

Therefore, the precipitated aggregates might be thought of as being in a form of aggregates of primary particles which, in turn, are often in a form of agglomerates of the aggregates. In a given mixture of the primary particles, it would normally be expected that a portion would be in a form of aggregates of the primary particles and a portion would be in a form of agglomerates of the aggregates.

In practice, while with appropriate elastomer mixing or shear conditions, the agglomerates might be broken down into their aggregate form, the aggregate form is considered herein to be relatively stable and is broken down into the primary particles only with difficulty, if at all, in typical elastomer mixing procedures.

Accordingly, measurements relating to properties of the precipitated aggregates are often directed to properties of the aggregates themselves.

To be suitable effective as reinforcement for rubber products such as vehicular tire treads, it is considered herein that certain property parameters for the aggregates are desirable.

In one aspect, it is to be appreciated that the surface configuration of the aggregates is composed of, or contains, micropores having a diameter of less than 2 mm, mesopores having a pore diameter in a range of from about 2 to about 50 mm and macropores having an average diameter of greater than 50 mm.

First, it is desired herein that the micropores in the surface of the aggregates be kept to a minimum.

Secondly, it is desired herein that the mesopore and macropore structures of the surface of the aggregates be within a defined range.

With regard to the micropores, values representing measurements thereof are as follows:

A measure of the surface are of the aggregates, including the micropores is considered to be the aforesaid BET surface area, which is based on a utilization of nitrogen gas for its measurement. The BET method is described in the Journal of the American Chemical Society, Volume 60, page 304 (1930). Here, for the purposes of this invention, a BET surface area in a range of about 80 to about 250, preferably about 140 to about 200, $m^2/g$ is specified. Such a range of BET surface values include many, if not most, of commercially available precipitated silicas.

However, it is also considered herein that the micropores in the aggregate's external surface are too small to have an appreciable effect on the substantially larger rubber molecules of the tread rubber composition of this invention.

A more representative measure of the external surface area of the aggregate that the rubber molecules actually "see", thus, tending to exclude the micropores of the aggregate surface, is conducted by a CTAB method utilizing cetyl trimethyl ammonium bromide. The CTAB surface area for the purposes of this invention is the external surface area of the aggregate as measured by the absorption of the cetyl trimethyl ammonium bromide utilizing a pH of 9, instead of a pH of 7, and otherwise in accordance with the method described by Jay, Janzen and Kraus in "Rubber Chemistry and Technology", 44 (1971), pages 1287–1296. It is considered that the CTAB surface area excludes the aggregates' micropores.

It can readily be seen that if the aggregates have an appreciable amount of microporosity as indicated by the BET measurement, the BET surface area which includes the micropores will be larger than and will substantially exceed the aforesaid surface area.

It is considered herein that a BET/CTAB ratio about 1/1 is indicative of little or no microporosity of the aggregates since the measured surface area would thereby be essentially equal for the two analytical methods.

Accordingly, for the aggregates for the tread rubber of this invention, a BET/CTAB ratio in a range of about 0.8/1 to about 1.2/1, preferably about 0.9/1 to about 1.1/1, is desired, thus, indicating a relative minimum of microporosity for the aggregates. While theoretically a minimum BET/CTAB ratio would probably be 1/1, the aspect of the recited range extending below 1/1 is to allow for variance in experimental technique and corresponding experimental results in measuring the surface areas.

While representative BET surface area values for the aggregates have earlier been presented, it is now considered that the following ranges of BET surface areas may be more representative for the aggregates, namely, a BET surface area of about 80 to about 250, and more preferably about 140 to about 200 $m^2/g$, which both overlaps and includes a major portion of the hereinbefore recited ranges of 100 to 500 and 140 to 200 $m^2/g$.

As hereinbefore pointed out, the aggregates tend to agglomerate together to form agglomerates. The mixing of rubber and agglomerates of said aggregates under high sheer mixing conditions causes at least a portion, and probably mostly all, of agglomerates to break down to aggregates.

The physical configurations of the actual aggregates, which are themselves composed of pluralities of primary particles joined, or bonded, together, is important for the tread rubber compositions of this invention. The physical configuration of the aggregate is considered to contain concave regions of various volumes which are hereinbefore referred to mesopores and macropores.

While a mechanism may not be clearly understood, the aforesaid mesopores and macropores are considered herein to apparently capture or grasp portions of the elastomer during the mixing of elastomer aggregates. It is considered herein that the containment, or capture, of a portion of the elastomer within or by the mesopore and macropore regions of the aggregates substantially enhances the reinforcing effect of the aggregates for the tread rubber in a practice of this invention.

It appears to be important that the average volume of the mesopores and macropores of the aggregate configuration be neither too small nor too large for an optimization of this effect.

A measure of such mesoporisity and macroporisity of the aggregates may be determined by mercury porosometeric measurement, for example, with a Porosimeter 2000 from Carlo Erba Instruments. A sample of aggregates, typically in a form of the aforesaid aggregates and agglomerates thereof, in an amount of about 0.05 to about 0.1 grams, is dried 2 hours at 120° C. in an open air oven. The sample is degassed about 1 hour at about 23° C. under $10^{-3}$ mm Hg vacuum. The instrument is prepared, or calibrated, by using a Carlo Erba calibration kit 150.060.42. The prepared sample is analyzed in the Instrument with triple distilled mercury and with a 6.25 cm$^3$ dilatometer, pressure in a range of about 1 to about 2000 bar, a surface tension of mercury of about 480 Dyn/cm and an angle of contact of about 141 degrees. The pore diameters may be calculated by, for example, the Washburn equation. E. W. Washburn, Proc. Nat. Academy Science U.S.A., 7, 115 (1927). It is believed that such technique is well known to those skilled in such art.

The mercury porosimeteric pore size distribution is such that the pore volume (V2) comprises pores from 17.5 to 27.5 nm in diameter is at least 50 percent of the total pore volume comprising pores of no more than 40 nm in diameter. (V1 is the total volume of pores with a diameter smaller than 40 nm). This is referred to herein as "pore volume-diameter". A desired ratio herein is a V2/V1 ratio in a range of about 0.5/1 to about 0.7/1.

In the description of the invention it has hereinbefore been set forth that a desirable coupler has a moiety reactive with filler aggregate surface and a moiety reactive with the carbon-to-carbon double bonds of the said elastomer. While it is recognized that the surface of the aggregate of this invention contains active sites and that it would generally be desirable for a moiety of the coupler be reactive with such sites, it is also recognized that it may also be desirable for the aforesaid moiety of the desirable coupler to be reactive with the aggregate in general, even though the hydroxyl groups may be normally primarily relied upon as the reactive site on the aggregate.

Accordingly, it is desired that the silica coupler have a moiety reactive with the aggregate of this invention, typically the silicon dioxide of the aggregate, and a moiety reactive with the carbon-to-carbon double bonds of the elastomer.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of (A) 100 parts by weight of a diene based elastomer, (B) about 5 to about 100 parts by weight of an aggregate of particles and (C) a silica coupler having a moiety reactive with silicon dioxide and a moiety reactive with the carbon-to-carbon double bonds of said elastomer; wherein said aggregate of particles is an aggregate characterized by having a BET surface in a range of about 100 to about 500 m$^2$/g, a CTAB surface in a range of about 100 to about 300 m$^2$/g, wherein the BET/CTAB ratio is in a range of about 0.8/1 to about 1.2/1, and a mercury porosometeric pore size distribution of V1/V2 ratio in a range of about 0.5/1 to about 0.7/1 and by being prepared by the steps of:

(A) reacting at least two inorganic materials with a strong base and forming a water solution of a product thereof, wherein said inorganic materials are comprised of, based on 100 parts by weight thereof, about 0.1 to about 99.9 parts silicon dioxide and, correspondingly, about 99.9 to about 0.1 parts of at least one additional inorganic material selected from an oxide and/or salt of aluminum with a restriction that said additional inorganic material is reactive with a strong base to form a water soluble product thereof;

(B) treating said water solution by the addition of at least one mineral acid thereto to react with said product to form a reaction product thereof and to reduce the pH of the solution and thereby produce precipitated particles of the reaction product as a precipitate;

(C) optionally interrupting the said acid addition of step (B) to the said water solution to allow the said precipitate to age for a period of time before resuming the addition of acid, followed by adding additional acid until a desired pH is reached to complete the said reaction and precipitation of the reaction product;

(D) optionally, after said acid addition of step (B), and/or step (C) if used, is completed, allowing the precipitate to age for a period of time;

(E) filtering and washing the precipitate with water and drying the precipitate to recover the primary particles in the form of an aggregate thereof and having a water of adsorption on the surface of the particles of the aggregate;

(F) optionally modifying step B and/or step C by treating the said precipitate by the addition to said precipitate of at least one electrolyte having an anion selected from at least one of carbonate, silicate, aluminate, borate, alumosilicate, phosphate, sulfate, halogenide, titanate and zirconate and cation selected from at least one of lithium, sodium, potassium, magnesium and/or calcium.

(G) optionally an additional step, during and/or following step (E) comprised of grafting onto said reaction product and/or precipitate at least one functional group and/or polymer, by a process of a reaction between the silanol groups, Si—O—Si groups and/or any other active sites on the surface thereof wherein said functional group is provided by reaction therewith at least one of (i) material of the type X and/or X-R, (ii) material of the type X-R-Y and (iii) a material of the type X-R-Z and/or (X-R-Z)$_2$ wherein where R is an aliphatic hydrocarbon radical having from 2 to 30 carbon atoms or an aromatic or hydrocarbon substituted aromatic radical having from 6 to 30 carbon atoms, X and Y are the same of different radicals selected from at least one of hydroxy, amino, alcoholate, cyanide, thiocyanide, halogen, sulfonic acid, sulfonic acid ester, thiol, benzoic acid, benzoic acid esters, carboxylic acid, carboxylic acid ester and organo silane radicals and Z is a radical selected from $S_n$ and $Se_n$, where n is an integer of from 2 to 6, or an unsaturated radical selected from allyl, vinyl, acryl and aryl radicals; and where said polymer is selected from at least one of synthetic cis 1,4-polyisoprene natural and/or natural rubber, cis 1,4-polybutadiene, polystyrene, polychloroprene, polyacrylonitrile, styrene-butadiene-copolymer rubber, butadiene-isobutylene-copolymer, EPDM, styrene-isoprene-butadiene terpolymer rubber and isoprene-butadiene copolymer rubber;

(H) optionally an additional step, following step (E), comprised of treating said dried precipitate with at least one non-ionic and/or non-ionic surfactant; provided, however, that the said process shall include at least one of said steps (F), (G) and (H).

2. The rubber composition of claim 1 wherein the said elastomer is selected from one at least one of cis 1,4-polyisoprene rubber—natural and synthetic, cis 1,4-polybutadiene rubber, styrene/butadiene copolymer rubber, butadiene/isobutylene copolymer rubber, EPDM rubber, styrene/isoprene/butadiene terpolymer rubber, butadiene/acrylonitrile rubber, 3,4-polyisoprene rubber and isoprene/butadiene copolymer rubber.

3. A rubber composition of claim 1 comprised of (A) 100 parts by weight of at least one diene based elastomer, (B) about 60 to about 90 parts by weight of the said aggregate wherein, for said aggregate, the inorganic materials for step (A) in its process of preparation are comprised of, based on 100 parts by weight thereof, about 60 to about 99.9 parts silicon dioxide and, correspondingly, about 40 to about 0.1 part of natural and/or synthetic aluminum silicate.

4. A rubber composition of claim 1 comprised of (A) 100 parts by weight of at least one diene based elastomer, (B) about 60 to about 90 parts by weight of the said aggregate wherein, for said aggregate, step (F) in its process of preparation is required.

5. A rubber composition of claim 2 comprised of (A) 100 parts by weight of at least one diene based elastomer and (B) about 60 to about 90 parts by weight of the said aggregate wherein, for said aggregate, the inorganic material for step (A) of its process of preparation is comprised of natural and/or synthetic aluminum silicate.

6. A rubber composition of claim 1 comprised of (A) 100 parts by weight of at least one diene based elastomer, (B) about 60 to about 90 parts by weight of the said aggregate wherein, for said aggregate, the inorganic material for step (A) of the process of its preparation is comprised of, based on 100 parts by weight thereof, about 60 to about 99.9 parts silicon dioxide and, correspondingly, about 40 to about 0.1 parts of at least one of said other inorganic materials as at least one oxide and/or salt.

7. A rubber composition of claim 1 comprised of (A) 100 parts by weight of at least one diene based elastomer, (B) about 60 to about 90 parts by weight of the said aggregate wherein, for said aggregate, step (H) of its preparation is required in which the dried precipitate is treated with a surfactant selected from at least one of alkylbenzene sulfonate, alcohol sulfate, alcohol ether sulfate, alcohol ethoxylate, alkylphenol ethoxylate, fatty acid alkanolamine and fatty acid amine oxide.

8. A rubber composition of claim 1 comprised of (A) 100 parts by weight of at least one diene based elastomer, (B) about 60 to about 90 parts by weight of the said aggregate wherein, for said aggregate, step (G) of its process of preparation is required; for step (A) of said process, the said inorganic materials are comprised of, based on 100 parts by weight thereof, about 60 to about 99.9 parts silicon dioxide and, correspondingly, about 40 to about 0.1 parts of at least one of said other inorganic materials as least one oxide and/or salt; wherein, for step (G) where said functional group is grafted onto said reaction product by reacting with at least one of (i) material of the type X and/or X-R, (ii) material of the type X-R-Y and (iii) a material of the type X-R-Z and/or $(X-R-Z)_2$ wherein where R is an aliphatic hydrocarbon radical having from 2 to 30 carbon atoms or an aromatic or hydrocarbon substituted aromatic radical having from 6 to 30 carbon atoms, X and Y are the same of different radicals selected from at least one of hydroxy, amino, alcoholate, cyanide, thiocyanide, halogen, sulfonic acid, sulfonic acid ester, thiol, benzoic acid, benzoic acid esters, carboxylic acid, carboxylic acid ester and organo silane radicals and Z is a radical selected from $S_n$ and $Se_n$, where n is an integer of from 2 to 6, or an unsaturated radical selected from allyl, vinyl, acryl and aryl radicals; wherein said $(X-R-Z)_2$ may also be selected from at least one of the symmetrical molecules of X-R-Z-Z-R-X bis-(3-triethoxysilylpropyl)tetrasulfide, $(CH_3—CH_2—O—CH_2—O)_3—Si—(CH_2)_3—S—S—S—S—(CH_2)_3—Si—(O—CH_2—CH_3)_3$ and $((CH_3—CH_2—O)_3—Si—(CH_2)_3—S—S)_2$.

9. A rubber composition of claim 8 wherein, for said aggregate, for step (A) of its process of preparation said other inorganic material is comprised of natural and/or synthetic aluminum silicate.

10. A pneumatic tire having a tread comprised of the rubber composition of claim 1 (A) 100 parts by weight of at least one diene based elastomer, (B) about 5 to about 100 phr of an aggregate material where said material is comprised of about 50 to about 100 weight percent of said aggregate of particles and, correspondingly, about zero to about 50 percent silica, (C) at least one silica coupler having a moiety reactive with silicon dioxide contained in said aggregate and a moiety reactive with said elastomer, in a weight ratio of aggregate and silica, if silica is used, to coupler of about 7/1 to about 15/1, and (D) about 0 to about 80 phr carbon black, wherein the weight ratio of aggregate and silica, if silica is used, to carbon black, where carbon black is used, is at least about 0.1/1, and where the total of aggregate and silica, if silia is used, and carbon black, if carbon black is used, is about 60 to about 120 phr.

11. A pneumatic tire having a tread comprised of the rubber composition of claim 1 or 2 wherein said rubber also contains about 5 to about 30 phr carbon black, wherein the weight ratio of said aggregate to carbon black is at least about 3/1 and where the total of aggregate and carbon black is about 60 to about 120 phr.

12. A pneumatic tire having a tread comprised of the rubber composition of claim 4.

13. A pneumatic tire having a tread comprised of the rubber composition of claim 5.

14. A pneumatic tire having a tread comprised of the rubber composition of claim 6.

15. The pneumatic tire of claim 10 wherein, for step (A) of the preparation of said aggregate of particles, the said inorganic materials are comprised of, based on 100 parts by weight thereof, about 60 to about 99.9 parts silicon dioxide and, correspondingly, about 40 to about 0.1 parts of at least one of said other inorganic materials is comprised of natural and/or synthetic aluminum silicate.

16. A pneumatic tire having a tread comprised of the rubber composition of claim 7.

17. A pneumatic tire having a tread comprised of the rubber composition of claim 8.

18. A pneumatic tire having a tread comprised of the rubber composition of claim 9.

* * * * *